Aug. 8, 1950 D. D. LOWBER ET AL 2,518,240
PROJECTION MICROSCOPE
Filed July 25, 1947 4 Sheets-Sheet 1

INVENTORS
DAVID D. LOWBER
JOSEPH D. REARDON
BY
ATTORNEY

Fig. 4

Aug. 8, 1950     D. D. LOWBER ET AL     2,518,240
PROJECTION MICROSCOPE Filed July 25, 1947     4 Sheets-Sheet 4

INVENTORS
DAVID D. LOWBER
JOSEPH D. REARDON
BY *Roty C. Williams*
ATTORNEY

Patented Aug. 8, 1950

2,518,240

UNITED STATES PATENT OFFICE 2,518,240

PROJECTION MICROSCOPE

David D. Lowber, Ann Arbor, Mich., and Joseph D. Reardon, Buffalo, N. Y., assignors to American Optical Company, Southbridge, Mass., a voluntary association of Massachusetts Application July 25, 1947, Serial No. 763,594

23 Claims. (Cl. 88—24)

This invention relates to projection microscopes of the metallographic type and more particularly to improvements therein for producing a sturdier, more compact, efficient and versatile instrument than heretofore available; whereby opaque objects such as metals and the like may be subjected to incident light and conveniently inspected under various predetermined degrees of magnification through a visual system of said instrument; or an image thereof, of equal or different predetermined magnifications, may be as conveniently projected through a projection system and unto a screen or plate of said instrument for viewing, photographic or like purposes.

Heretofore metallographic instruments have been employed for the inspection and photographing of opaque objects but each of these earlier instruments have been restricted in its use for various reasons. For example, different adjustments of the objective of the instrument were necessary when the visual and the projection systems thereof were employed. It was necessary after the visual system had been accurately focused for giving a desired degree of magnification, to have to readjust the objective while watching the viewing screen in order to produce a proper imaging of the specimen upon the screen. And if the specimen were to be photographed, the photographic holder could only be substituted after the image had been so focused. Not only were these bothersome and time consuming steps but it was also found to be extremely difficult at high degrees of magnification, say 1000X or 1500X, to obtain the accurate imaging desired because of the dimness of said image upon the screen, particularly when certain colored filters were being used. And furthermore, when the image had been accurately focused, its magnification was not the same as that obtained through the visual system, although such was often desirable.

Such instruments of earlier construction used either a single objective or a plurality of separately interchangeable objectives, and it was necessary to readjust the distance between the specimen upon the supporting stage and the objective each time a change of objectives was made. One could not merely change objectives for a change in magnification and have the specimen remain substantially accurately in focus. It was even necessary in some instruments to move the stage in order to change objectives. And since these objectives projected upwardly toward the supporting stage and were of different lengths, care had to be exercised to avoid injury thereto by a lowering of the stage too great amounts.

Additionally in said earlier instruments, the over-all vertical distance was considerable but was considered necessary in order to provide images of sufficient size, magnification and optical quality on the viewing screen.

The present invention has overcome the several difficulties and objections mentioned above by providing a micrometallographic instrument which employs a plurality of parfocalized objectives of different magnifications mounted upon a turret which is normally retained upon the instrument beneath the specimen supporting stage thereof and may be readily rotated in any position of adjustment of the stage or turret without interference by said stage. The stage and the turret carrying the several objectives are supported upon the rigid main supporting base or housing of the instrument in such a manner that each may be readily adjusted vertically independently of the several other parts of the instrument. Not only is a sturdier construction thus afforded but also in this manner the optical axis of the instrument is established by the parfocalized and parcentered objectives on the turret and all other optical elements of the instrument are arranged for optical alignment therewith.

Furthermore, the several objectives, the vertical illuminator and an intermediate lens system associated therewith are so constructed and arranged in a parfocalized relation to both the visual system and the projection system that the objectives may function selectively with the visual system or the projection system of the instrument and provide sharply focused images in either. Also by proper adjustment of the parts these images in is visual and projection systems may be caused to be of like predetermined magnifications.

In order to provide good optical properties in the image projected upon the viewing screen or the photographic plate substituted therefor, it is desirable to use a projection lens system of relatively long focal length which in earlier instruments "lengthened out" considerably the overall dimensions thereof. A more compact and sturdy construction has been provided in the instrument of the present invention by employing therein means in the form of a rhomboid prism in the projection system thereof to reduce the overall vertical dimensions of the instrument while still allowing the viewing screen to be located compactly beneath the visual eyepiece of the instrument.

To further increase the range of the instrument there is provided a graduated set of interchangeable visual eye pieces (or eye lens systems) for the visual system of the instrument and a graduated set of interchangeable projection eye pieces (or projection lens systems) for the projection system of the instrument, said sets being substantially correspondingly graduated in power so as to give, when positioned in their proper places in the instrument, resultant images of equal magnification. Also a carrier for the projection lens systems may be provided within the housing and actuated from the outside thereof for selectively moving each projection lens system into optical alignment in the instrument when desired.

In the instrument of the present invention, it is of utmost importance that the semi-transparent reflector of the vertical illuminator, the vertical illuminator carrying the intermediate lens system, and a reflector for allowing selective use of the visual or projection systems of the instrument be readily adjustable to allow proper optical alignment thereof with the objective aligned with the object on the stage as well as with the visual and projection lens systems, and accordingly there is provided in connection with each of these several parts, suitable means for effecting such adjustments in an easy and accurate manner.

The invention will be more fully understood upon a consideration of the detailed description which follows when taken in conjunction with the accompanied drawings in which.

Referring to the drawings in detail, and particularly Figs. 1 to 4, it will be seen that the invention comprises a supporting base in the form of a main hollow housing 10 upon which are secured a stage supporting housing 12 and an auxiliary housing 14. The main housing 10 is formed as a generally rectangular box-like form provided with a central forwardly projecting portion 16 having an opening 16' in its upper sloping wall 17 for allowing an image to be projected therethrough and onto an adjustable viewing and photographing assembly which will be described in detail hereinafter.

The upper horizontal wall 15 of the main housing 10 is centrally recessed at 15' and is arranged to receive the stage supporting housing 12 thereon. This housing 12 has laterally extending rigid bracket arms 18 provided with suitable bolt receiving openings so that housing 12 may be fixedly secured in place upon the upper wall 15 of said main housing 10. A central substantially square area near the forward edge of the upper wall of housing 10 is arranged to receive the auxiliary housing 14 which may similarly be fixedly secured upon the main housing 10 by sets of front and rear screws 19 (see Fig. 4). These screws, however, extend through slightly enlarged openings in the upper wall of the main housing for allowing limited horizontal adjustment of the auxiliary housing for aligning purposes as will be more fully hereinafter described. A cover plate 10' serves to allow access through the rear wall of the main housing 10.

Figure 2:
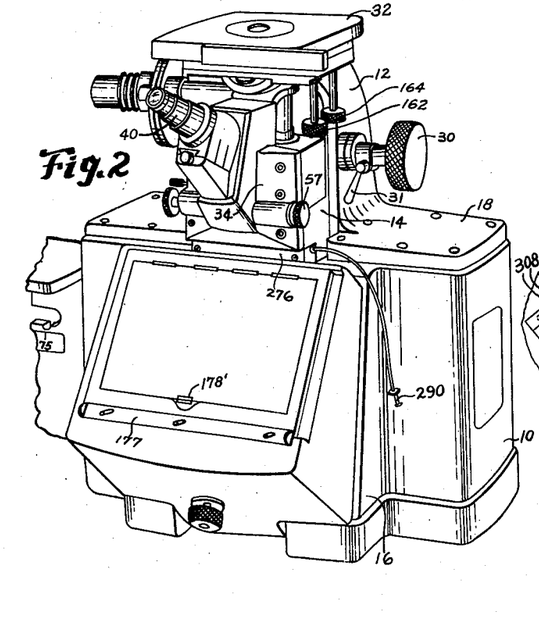
Fig. 2 is a similar view of the instrument, but viewed partly from the right side thereof.
Figure 4:
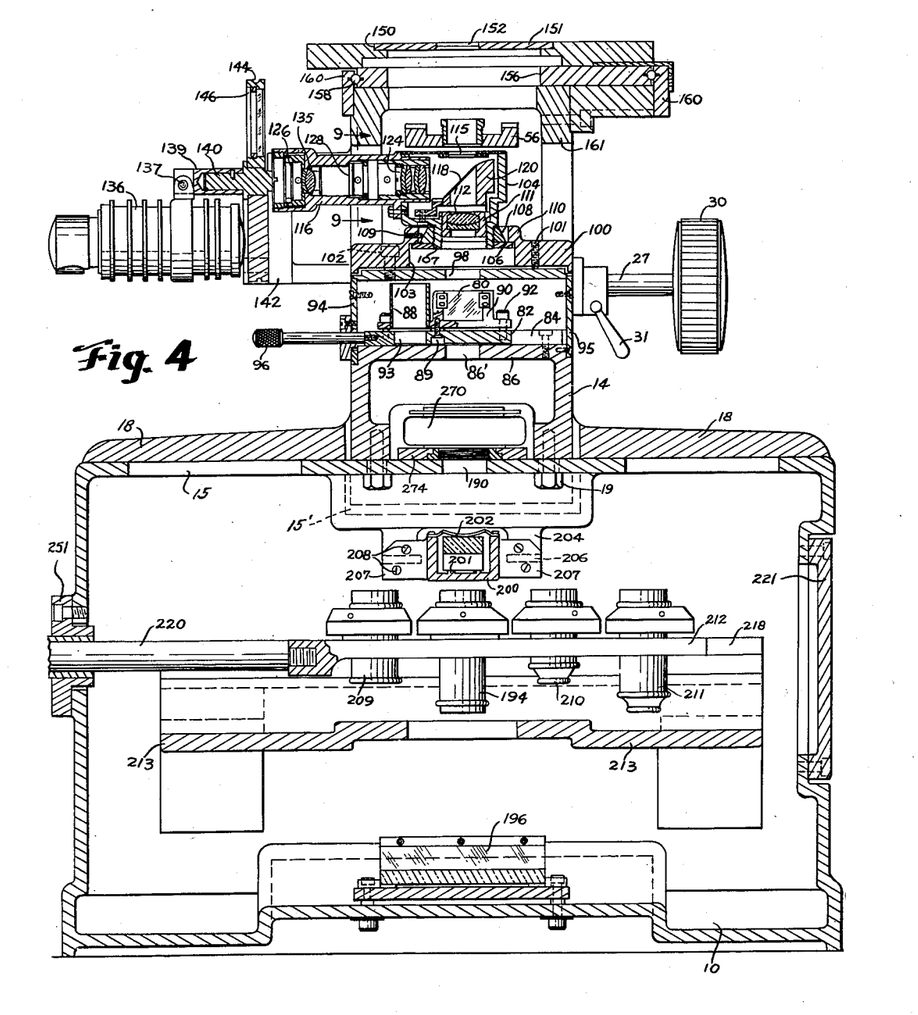
Fig. 4 is a vertical section view taken substantially along the section line 4—4 of Fig. 3 and looking in the direction of the arrows.

The stage supporting housing 12 is provided with a central upstanding hollow portion 20 formed integrally with the lateral extensions 18 and as a continuation of the front wall of this portion 20 is formed an integral projection 21 so that said front wall together may support vertically extending guiding means 22 in the form of a dovetail connection for slideably guiding a stage supporting bracket 24 for vertical coarse adjustment. Projection 21 extends downwardly into recess 15'. This coarse adjustment is effected by a pinion gear 26 carried by a rotatable shaft 27 and arranged to engage a rack 28 carried on supporting bracket 24 so that when a coarse adjustment knob 30 is rotated a stage 32 carried upon said bracket may be moved vertically in relation to the optical system of the instrument. A lever 31 is shown in Fig. 2 in a position to clamp shaft 27 against rotation when heavy specimens or objects are to be supported on the stage. In Fig. 4 the lever is shown pivoted to its non-clamping position. An adjustable screw 33 is carried by a part fixed relative to the housing 12 and serves to limit the downward travel of bracket 24. The stop may be locked by an associated nut in various positions of adjustment.

The auxiliary housing 14 is arranged to detachably support a front cover plate 34 which has a forwardly and upwardly extending portion 35 arranged to detachably receive a guide block 36. Screws 37 extend through slightly enlarged holes in the block and into the front cover plate to allow limited lateral adjustment of the guide block 36. This block carries on an upper sloping surface thereof a dovetail guide 38 so that a monocular or binocular body tube assembly having complementary guides may be interchangeably positioned thereon, the drawings showing in the instant case a monocular body tube assembly 40. The body tube assembly 40 may be slipped onto the guide 38 and into engagement with a shoulder 41 at which time it may be locked in place by frictional engagement with the head of a pin 42 actuated in an upwardly direction by the pointed end of a set screw 43. The assembly 40 will then be axially in line with a bore 44 formed in said extending portion 35 and arranged to extend in a downwardly and rearwardly sloping direction.

Figure 3:
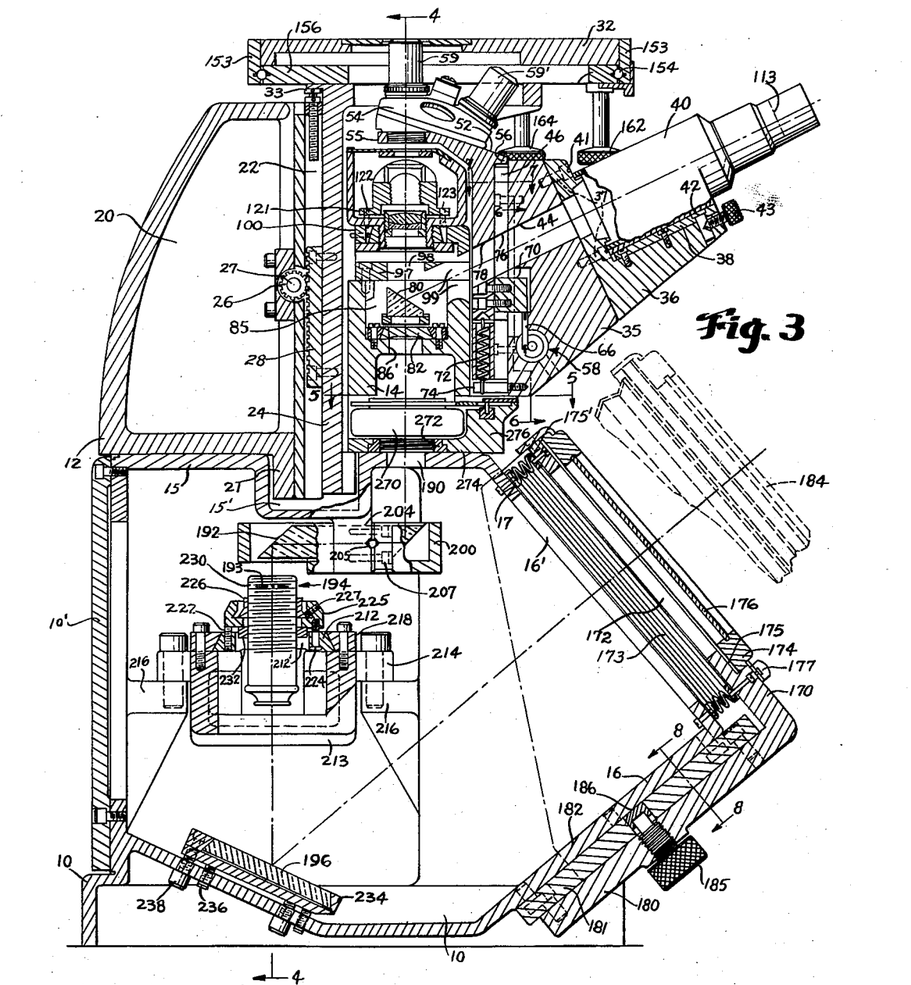
Fig. 3 is a longitudinal vertical sectional view taken substantially through the center of the instrument.
Figures 5, 6, 7, 9, 10, 11:
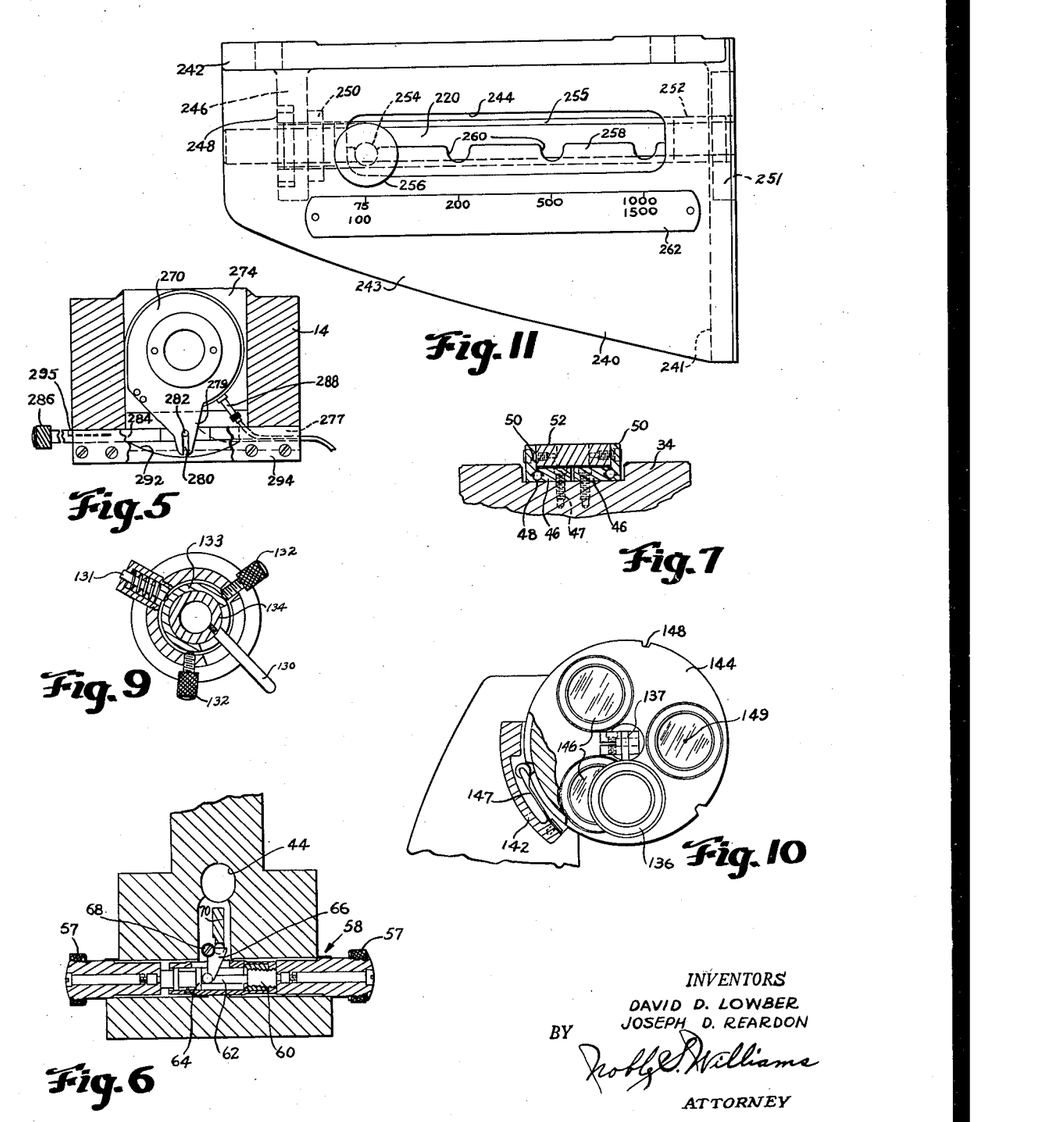
Fig. 5 is a sectional view taken substantially along section line 5—5 of Fig. 3 and looking in the direction of the arrows.
Fig. 6 is a sectional view taken substantially along section line 6—6 of Fig. 3 and looking in the direction of the arrows.
Fig. 7 is a sectional view taken substantially along section line 7—7 of Fig. 3 and looking in the direction of the arrows.
Fig. 9 is a sectional view taken substantially upon section line 9—9 of Fig. 4 and looking in the direction of the arrows.
Fig. 10 is a fragmentary view showing bracket means on a side of the instrument for supporting an incandescent lamp and a rotatable supporting disc associated with the instrument, portions of the bracket and disc being broken away to more clearly show details of construction.
Fig. 11 is an elevational view of an arc lamp supporting bracket and an adjustment mechanism associating with the projection system of the instrument.

Referring particularly to Figs. 3 and 7, it will be seen that a pair of plates 46 is centrally and detachably secured to the rear face of the cover plate 34 by screws 47 and these plates are provided with vertically extending V-grooves along their outer edges for receiving a plurality of ball bearings 48. The ball bearings 48 are engaged by a pair of V-grooved plates 50 which are in turn detachably secured to the opposite sides of a fine adjustment bracket 52 arranged to support an objective lens turret 54 on an upper rearwardly extending arm portion 55. An integral lip 56 is provided on bracket 52 and serves to overlie and cover the joint between the bracket and plates 46.

A pair of fine adjustment control knobs 57 is arranged to operate through a fine adjustment mechanism 58 for giving slight amounts of vertical adjustment of the lens turret 54 and the four parfocalized objectives 59, 59' (only two being shown) supported thereby for movement relative to the stage 32 and opaque objects positioned thereon. Fig. 6 shows the details of the fine adjustment mechanism 58, which mechanism is quite similar to the fine adjustment mechanism disclosed and claimed in copending application Serial No. 680,446 filed June 29, 1946. The mechanism comprises briefly a shift 60 to which the adjustment knobs 57 are secured and a central reduced portion 62 of the shaft is arranged with a circular contacting shoulder 64 arranged to bear against a roller carried by the lower end of a lever 66. The lever is pivotally secured by a screw 68 to the cover plate 34 in such a manner that a second roller on the lever positioned to one side of pin 68 will contact a block 70 and move same in an upwardly direction. Block 70 is detachably secured to bracket 52 and arranged so that upward movement thereof will cause upward movement of bracket 52 and fine adjustment of the objective lens turret. This upward movement results when the lever 66 is rotated in a counterclockwise direction, as viewed in Fig. 6, as shoulder 64 is moved to the right during rotation of either knob 58.

A tensioned spring 72 positioned in a vertical bore in the bracket 52 has one end arranged to engage a pin on the bracket and has its opposite end in engagement with a pin 74 secured in the cover plate 34 so that the combined action of this spring and gravity will be operative for moving the objective lens turret 54 and bracket 52 downwardly when lever 66 is allowed to rotate in the opposite direction. The plates 46 are provided with enlarged central openings 76 for accommodating the block 70 for vertical movement, as well as for accommodating the line of sight extending from the body tube assembly 40. A smaller opening 78 is provided centrally in the bracket 52 for accommodating the line of sight of the assembly 40. The purpose of these openings is to allow light rays coming from the object under examination and being reflected from a prism or first surface mirror 80 to reach said body tube assembly.

The prism or reflector 80 is mounted upon a transversely movable slide 82 which moves between V-guides 84 detachably carried by the auxiliary housing 14 and positioned in a transverse channel 85 formed therein. A central transverse web 86 of the housing 14 is provided with an opening 86' to accommodate the light beam passing downwardly from the objective 59, so that when the slide 82 is moved to the right from the position shown in Fig. 4 the proper amount, a tubular shield 88 will be positioned to surround the beam and exclude stray light which might otherwise enter through the bore 44. By loosening screws 19 the opening 86' may be suitably aligned with an opening in the housing 10 which will be later described.

In order to allow the prism 80 to be exactly aligned with the optical axis of the objective 59 and the optical axis of the body tube assembly 40, there is provided at 89 a centrally located securing means positioned in the slide 82 and extending upwardly into a frame 90. The frame 90 serves to position the prism 80 and the tube 88 upon the slide 82 and is universally tiltable slightly relative to the slide. A plurality of pull screws 92 are arranged to extend through the frame 90 and into the slide at points spaced about said securing means 89 and thus allow aligning adjustment of said prism. A light passage 93 is provided in the frame 90 directly beneath the shield 88. The opposite ends of the transverse channel 85 are closed by removable cover plates 94 and 95, respectively, and an aperture in plate 94 allows an actuating arm 96 to extend outwardly therethrough.

A supporting plate 97 is secured to the top of the auxiliary housing 14 and bridges across the channel 85. An aperture 98 therein accommodates the light beam from the objective 59 and an aperture 99 formed partly in this plate and partly in the front wall of the housing 14 at the upper edge thereof accommodates the beam when reflected toward the assembly 40. Upon the upper surface of this plate 97 is positioned a centrally recessed and apertured aligning plate 100 which is provided with three push and three pull screws 101 and 102, respectively, spaced about a central recess 103 so that a vertical illuminator housing 104 carried thereby may be readily optically aligned as a unit with the optical axis of the objective 59. The illuminator housing 104 is secured to plate 100 by a clamping and retaining collar 106 which is threaded on to a lower tubular extension 107 of said illuminator housing. Also carried by the extension is a bevel ring 108, and a plurality of spaced set screws 109 extending through a flange 110 of the plate 100 are provided for engaging the sloping surface of ring 108 for effecting a horizontal positioning thereof before collar 106 is tightened to clamp the illuminator housing against said flange.

Within the extension 107 is threaded a lens cell 111 carrying a relatively long focal length infinity corrected telescope lens system 112 which is arranged to receive a parallel beam of light from the objective 59 and form an image at the focal plane 113 of the visual eyepiece 114. This lens system completely seals the lower wall of the illuminator housing 104 so that no dust or the like from the outside can reach the interior therethrough. A transparent window 115, above the lens system 112 and positioned in a removable upper wall of the illuminator housing, also serves as a seal to exclude dust from the interior thereof. An opening in a side wall of the illuminator housing, for admitting light from an external light source, is closed by a tubular housing 116 which is detachably secured to and supported by housing 104. Thus a delicate semi-transparent reflector 118 positioned within the illuminator housing 104 and arranged at a 45° angle to the optical axis of the tubular housing 116 and to the optical axis through the lens 112 will be protected from dust and injury at all times.

The semi-transparent reflector 118, which may be of thin glass but preferably of very thin plastic, is supported by a mount 120 which is provided with a semi-circular flange 121 and a plurality of push and pull screws 122 and 123 respectively, extend therethrough so that this reflector likewise may be pre-aligned in housing 104 with the optical axes of said tubular housing 116 and the telescope lens system 112 before the housing 104 is assembled in the instrument.

Within the tubular housing 116 of the vertical illuminator is positioned an infinity corrected lens system 124 for projecting a parallel beam of light on to said reflector 118 and from the reflector toward objective 59. Thus a parallel beam of light will be reflected by the object focused upon the back through the objective and through the member 118 to the telescope lens 112. This system 124 is axially adjustable in the tubular housing by means of a lever 125 (see Fig. 1) for accurately imaging a field stop 126 upon the specimen under observation. The field stop 126 is positioned in the outer end of the tubular housing and controlled by arm 127. Also positioned within the tubular housing 116 at an intermediate location is an aperture stop 128 which may be controlled by a lever 130. Since it is most desirable that the aperture stop 128 be accurately centered, the housing 116 is provided with a spring pressed plunger 131 (see Fig. 9) and spaced adjusting screws 132 for adjusting the outer ring 133 of an iris diaphragm. The inner ring 134 thereof is rotated by lever 130. A condenser lens system 135 is located within and near the outer end of the tubular housing 116 and adjacent field stop 126.

A lamp 136 having an incandescent bulb and an arc lamp 138 are so arranged at the side of the instrument that they may be selectively positioned in axial alignment with the tubular housing 116 and lens systems carried thereby. The parts are so constructed and proportioned that the lamp 136, pivotally attached at 137 to a rotatable sleeve 139, may be swung on said sleeve about a pivotal support 140 (see Figs. 4 and 10) carried by bracket 142 on the side of the housing 12 without requiring that the arc lamp 138 be moved or readjusted.

Also carried upon the pivotal support 140 is a rotatable apertured disc 144 and in these apertures may be variously positioned removable cells 146 which may carry a frosted glass, or a filter medium, such as red, yellow, green or blue, or polarizing means, as desired by the operator of the instrument. Obviously, in the case of the latter the cell would be of the rotatable type. A spring detent 147 of conventional construction is carried by the bracket 142 and its roller carrying end serves to engage spaced depressions 148 in the grooved edge of the disc 144 for centering the selected aperture or cell in alignment with the axis the tubular housing which in the present instance is located at the point indicated by numeral 149.

The stage 32, previously referred to, is provided with a central aperture 150 into which may be placed a specimen supporting plate 151 having an aperture 152 over which an opaque specimen may be placed for observation. Several plates 151 having different sizes of apertures may be desirable for a single instrument. In order to inspect various portions of the specimen positioned over aperture 152, the stage is provided with a pair of transversely extending side plates 153 (see Fig. 3) having opposed grooves accurately formed therein for the reception of sets of ball bearings 154 which in turn engage spaced grooves in the front and back edges of an intermediate plate 156. The side edges of this plate 156 are likewise provided with accurately formed grooves (see Fig. 4) arranged to receive additional sets of ball bearings 158, and these ball bearings are in turn retained in place by a pair of side plates 160 secured to the upper horizontally extending arms 161 of the stage supporting bracket 24. A control knob 162 serves to actuate rack and pinion means (not shown) for effecting transverse movement of the stage 32 relative to the intermediate plate 156 and a second control knob 164, similarly provided with rack and pinion actuating means, serves to effect fore and aft adjustment of the intermediate plate and the stage thereon relative to the stage supporting bracket 24. Since this instrument is intended for operation under extremely high magnifications, it has been found most desirable to have extremely smooth and accurate translations of the stage in both directions and the use of ball bearings, as described above, accomplishes this accurate positioning without having "backlash" or "jumpiness" present therein.

Figure 1:
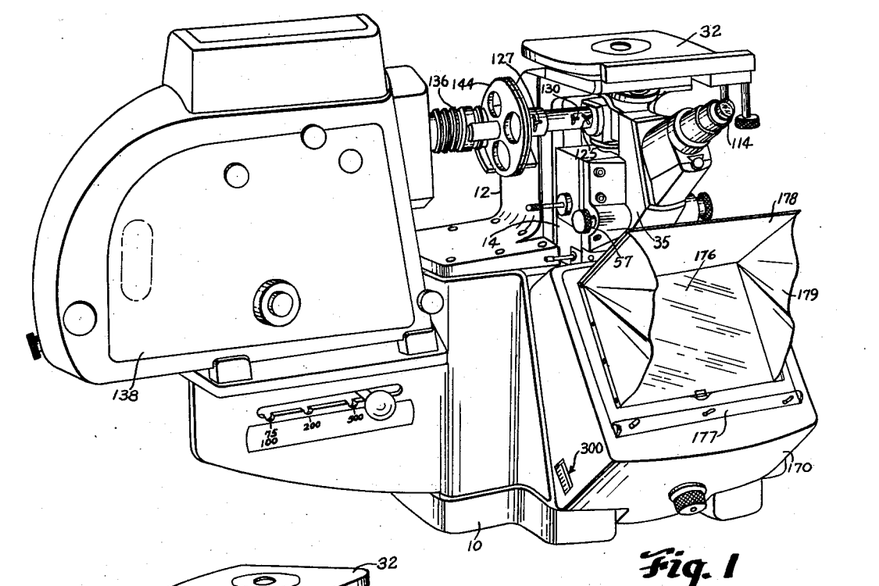
Fig. 1 is a perspective view of an instrument embodying the present invention and viewed partly from the left side thereof.

In order that photographic records as well as enlarged visual images may be produced by the instrument, there is provided on the forwardly projecting portion 16 of the main housing 10 an adjustable hood 170 which is arranged to overlie the front and sides of said projection and is provided with an aperture 172 arranged outwardly of aperture 16' in the housing 10. A flexible extensible bellows 173 has its opposite peripheral edge portions secured to the extension 16 so as to surround aperture 16' and to the hood 170 so as to surround aperture 172. Over the aperture 172 may be positioned a removable frame 174 which fits into a recess 175 with its upper edge under a retaining member 175'. This frame carries a ground glass plate or the like 176 onto which visual images of the specimen may be projected. Or, frame 174 may be readily removed and replaced by a holder for sensitized paper or film, and of a type well-known in the photographic field, by moving a clip 177 toward one side to retract its upper retaining edge during such substitution. In Figs. 1 and 2, the frame 174 is shown provided with a lid 178 which is urged to a raised position by spring hinges and is provided with flexible side curtains 179. A catch 178' serves to retain the lid in closed position.

Figure 8:
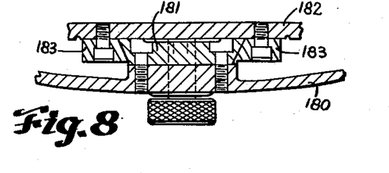
Fig. 8 is a sectional view taken substantially along section line 8—8 of Fig. 3 and looking in the direction of the arrows.

The hood 170 has a downwardly extending central portion 180. A suitable guide member 121 (see Figs. 3 and 8) may be located upon the inner surface of the hood and this portion 180 and upon the adjacent wall 182 of the projection 16 are secured guide members 183 to form a dovetail connection. These guide members serve to accurately guide the hood and the viewing screen (or the film or paper holder) when being moved outwardly to various positions of adjustment, one such position being indicated at 184. A clamping knob is shown at 185 and serves to press a plunger 186 into frictional contact with wall 182 for holding the hood in any adjusted position.

In order that the light beam passing downwardly from the objective 59 and the telescope lens 112 and through the tubular shield 88 and openings 93 and 86' (when this member 88 has been positioned in alignment therewith) may reach the viewing screen 176, there is provided in the main housing 10 an opening 190 and immediately beneath this opening is arranged a rhomboid prism 192 for directing the light beam rearwardly and then downwardly to a focal plane to also focus at this plane and serves to project the light rays toward a first surface mirror or reflector 196 where they are reflected upwardly on to the screen 176 as an accurately focused image when the screen is in proper adjustment. The rhomboid prism 192 effects a decrease in vertical as well as fore and aft dimensions of the instrument.

The prism is supported by a hollow bracket 200 having upstanding accurately machined ribs 201 therein upon which the prism rests, and resilient spring means 202 allows the prism to be adjusted in a horizontal plane and thereafter retains the prism in adjusted position. The hollow housing 200 is supported upon the main housing 10 by downwardly projecting arms 204 preferably formed integrally on the inner surface thereof. These arms are provided with transverse v-grooves 205 in which are positioned cylindrical pins 206 so that similarly grooved laterally extending brackets 207 on the hollow housing 200 may be engaged thereby. Pairs of adjusting screws 208 are provided for clamping the brackets 207 to arms 204 and for producing a pivotal adjustment of the prism 192 about pins 206. Thus the prism may be accurately adjusted into position relative to the optical axis of the instrument and securely retained in such position.

Beneath the rear sloping surface of the prism 192 is accurately positioned the projection lens system 194 so as to be optically aligned with objective 59 and lens 112. It is desirable to be able to selectively project onto the screen 176 images of different predetermined magnifications and for this purpose projection lens systems 209, 210 and 211 are also provided and focused at focal plane 193. These projection lens systems may be selectively positioned beneath the prism in place of lens system 194, and to allow this, there is provided an elongated V-slide plate 212 having a series of transversely aligned openings therein, one of which is shown at 212; and in each of these openings is positioned one of said projection lens systems. The V-slide 212 is arranged to move transversely of the instrument and is supported by an elongated rigid dropped-center frame 213 which has forwardly and rearwardly projecting arms 214 for firmly securing the frame upon integral brackets 216 extending inwardly from the interior surface of the main housing 10. The upper surface of this frame member 213 is arranged to support the slide 212 and carries thereon opposed guide members 218 which engage and guide the opposite sloping surfaces of said V-slide 212. A shaft 220 is detachably secured to one end of this slide 212 and extends outwardly through an opening in a side wall of the main housing 10 for adjustment purposes as will be presently described. A cover plate 221 at the opposite side of the housing 10 allows insertion of the slide and adjustment of the projection lens systems thereon.

While a slide has been shown at 212 in the preferred embodiment for moving the projection lens systems into optical alignment, it would also be possible to successfully employ a turret, somewhat like that employed at 54, with means for actuating same from the outside of the housing. Such, however, would materially increase the size of the housing 10 and, accordingly, is less desirable.

Each projection lens system is mounted in its respective opening in the V-slide 212 by sets of three push and three pull screws 222 and 224, respectively, engaging said slide and supporting collar 225 so that each lens system, 192, 209, 210 or 211 may be accurately axially aligned into parallelism with the optical system of the instrument, that is relative to the optical axis extending from objective 59 downwardly through the telescope lens 112 and prism 192. In order that each projection lens system 192 may be shifted laterally to make its optical axis coincident with the axis of the optical system of the instrument, when moved into operative position therein, there is provided a flanged collar 226 which is supported by an internal flange on supporting collar 225 and may be centered and held in position relative thereto by a set of three set screws 227.

In order that each projection lens system may be accurately axially adjusted to focus at the focal plane 193 of telescope lens 112, for producing a parfocalizing of the projection lens system, the outer tubular wall of the associated lens housing 230 is provided with a fine screw thread arranged to have adjustable engagement with the collar 226. After the housing 230 has been properly adjusted axially, a securing collar 232 may be clamped against the lower side of the flange on collar 225 and serve to secure the collar 226 and thus the projection lens system in alignment.

The reflector 196 is mounted in a retainer 234 and this retainer is in turn mounted upon a lower wall of the main housing 10 by sets of push and pull screws 236 and 238, respectively, so that the reflector may be properly adjusted to reflect light coming from the projection lens system upon the screen 176.

In Fig. 11, there is shown an arc lamp supporting bracket 240 which may be integrally formed on the side of the main housing 10 or detachably attached thereby as by a vertical web 241. The bracket is provided with a horizontally extending table portion 242 to which the arc lamp 138 may be detachably secured. In a second vertical web 243 of bracket 240 is provided an elongated slot 244 and upon the rear surface of this vertical web and the table portion is integrally formed a flange 246. An elongated circular guide member 252 is arranged to extend through a hole in flange 246 and through a hole in the wall of main housing 10 and is provided with suitable clamping nuts 248 and 250 threaded onto its outer end. A collar 251 secured to the wall 10 serves to support the inner end. Since these holes are slightly oversized, they allow accurate aligning of opposite ends of guide member 252. Within this circular guide member 252 is arranged the shaft 220 for adjusting the slide 212.

The shaft 220 is provided with a forwardly extending rod 254 which extends through an elongated slot 255 in the member 252 for axially shifting the shaft 220 and slide 212 and a handle or knob 256 is positioned at its outer end. Rod 254 also extends through the slot 244 in web 243 so that the knob 256 is positioned forwardly thereof. A plate 258 having accurately positioned notches 260 formed in its upper edge may be detachably secured to the rear face of web 243, or these notches may be formed directly in the bracket 240, if desired. The rod 254 is of such a size as to closely fit the notches.

When it is desired to shift from one projection lens to another, the rod 254 may be swung upwardly slightly, pivoting the shaft 220 in its guide member 252, and then rod 254 may be moved laterally in slot 244 until it is opposite any one of the other notches 260, after which it may be swung downwardly into the notch for centering the projection lens system associated therewith in an exact predetermined optically aligned position. At this time one of the projection lens systems carried by slide 212 will be accurately aligned with the optical axis extending downwardly from the lens system 112 and through the rhomboid prism 192. A graduated scale 262 is provided on the forward face of web 243 and carries reference numerals and marks indicating the different settings and magnifications for the several projection lens systems carried by slide 212. Attention is directed to copending application Serial No. 68,014, filed December 29, 1948, which also shows structure for selectively and accurately positioning a plurality of projection objectives in operative position in a similar instrument.

Since the instrument is intended for photographic purposes, it is desirable to provide in the projection system of the instrument a camera shutter. Such a camera shutter of conventional construction is shown at 270 and secured by a ring 272 to a flat apertured plate portion 274 of a removable block 276. This block has laterally extending arms 277 (see Fig. 5) positioned in recesses in the auxiliary housing 14 and these arms are shown secured by screws or the like to the front of the auxiliary housing 14 immediately above the main housing 10. Thus the block 276 and the camera shutter carried thereby may be easily removed as a unit from the instrument should such be necessary for purposes of repairing or replacing the shutter mechanism.

The shutter mechanism 270 is provided with a forwardly extending arm 279 having an elongated slot 280 formed therein and arranged to engage an upstanding pin 282 carried by a transversely slidable square bar 284. The bar 284 extends laterally outwardly of the instrument and is provided with a control knob 286 at its outer end so that the bar may be moved laterally to various predetermined positions to adjust the timing mechanism for the shutter for various exposure speeds as desired. A series of graduations may be marked upon the forward face of this square bar and serve to indicate said shutter settings. A flexible actuating cable 288 extends outwardly from the shutter mechanism and through an opening between the laterally extending arm 277 and auxiliary housing 14 and is provided with a push-button type of manual control 290 at the outer end thereof.

The upper surface of the block 276 is arcuately recessed as indicated at 292 to accommodate the swing of the slotted arm 279 and a removable plate 294 is secured thereover and serves to retain parts of the mechanism in place when the block 276 and shutter structure carried thereby are being removed from the instrument has a unitary assembly. A spring finger 295 or other suitable detent means may be provided for bar 284, if desired, for providing friction means for holding the bar at its proper settings.

The instrument is also constructed and arranged with a set of interchangeable parfocalized visual lens systems, one of which is shown at 114 in Fig. 1, and arranged to fit in the body tube assembly 40 so as to focus at the focal plane 113 of the telescope lens 112, so that, for each projection lens carried upon slide 212, there will be a visual lens system or eyepiece having an equivalent magnification. This parfocalizing of the visual and projection lens systems becomes exceedingly important when it is desired to use high degrees of magnification, for example magnifications as high as 1,000X or 1,500X. At such high magnifications the projected image upon the screen 176 may become so exceedingly faint, particularly when certain types of color filters are being employed in front of the vertical illuminator, that proper focusing of the objective upon the specimen by watching the image upon screen 176 would be impossible. Nevertheless, it may be desired to photograph the specimen under such conditions. It is most satisfactory to be able to look through the visual system and observe the specimen at this high magnification and to be able to photograph what has been observed even though same was not visible upon the screen.

Figure 12:
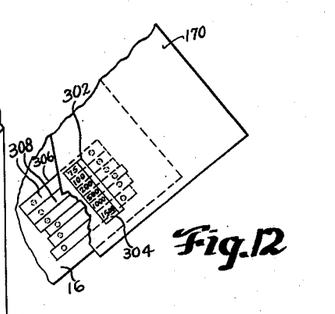
Fig. 12 is a fragmentary view showing an adjustable scale for the projection screen or plate of the instrument.

It is necessary to properly position the screen, or the sensitized photographic material holder, at a proper location for each different magnification being used and to allow this the hood 170 is provided with indicating means, indicated generally at 300 in Fig. 1 and shown in detail by Fig. 12. This means may comprise a slot 302 formed through a side of the hood 170 at right angles to its direction of movement and provided on an inwardly sloping surface adjacent this slot is a graduated scale 304 bearing the degrees of magnification provided for the instrument. Upon the extension 16 of the housing 10 is provided a plurality of parallel bars or the like 306 arranged in any suitable manner to be individually adjustable throughout a limited distance in the direction of movement of the hood. Each bar is provided upon its outer face with a graduation or mark, such as indicated at 308, for indicating the exact position at which the forward edge of the scale 304 should be placed for best imaging for each degree of magnification indicated by the scale.

Since it is exceedingly important that all of the optical elements of the visual and projection systems be accurately optically aligned with the optical axis of the objective located in its operative position beneath the stage 32 is used as the datum or base line. All of the other optical elements and associated parts are, accordingly, arranged for adjustment into proper positions relative thereto by means already described. These parts include the vertical illuminator housing 104, the semi-transparent member 118 carried thereby, reflecting prism 80, the telescope lens 112, the block 36 carrying body tube 40, the rhomboid prism 192, the several adjustments for the projection lens systems 194, 209, 210 and 211 and the reflecting means 196 provided with aligning and centering means which must be accurately successively adjusted relative to said objective. The telescope lens 112 must also be axially adjusted so as to focus accurately at the image plane 113 of the visual eyepieces, after which the projection lens systems 194, 209, 210 and 211 must be individually axially adjusted to focus accurately at the thus established image plane 193 of the telescope lens. The final adjustments will be made by properly positioning the bars 306 so that marks 308 thereon will indicate the proper location for the plate 176. These adjustments are necessary in order that an accurate alignment of both the visual and the projection systems will be produced and in order that an accurate parfocalizing of one system relative to the other will be effected.

Having described our invention, we claim:

1. An instrument of the character described comprising a supporting base, a stage for supporting opaque objects for examination above said base, means for providing coarse adjustment of said stage relative to said base, an objective beneath said stage and positioned for optical alignment with an object on said stage, a bracket for supporting said objective for movement relative to said base, a vertical illuminator mounted in relatively fixed relation to said base and located beneath said objective so as to direct light for illuminating said object upwardly toward said objective, a lens system in optical alignment with said objective and illuminator and arranged to receive light from said objective for forming an enlarged image of said object, and a fine adjustment mechanism supported by said base and arranged to move said bracket and objective relative to said base.

2. An instrument of the character described comprising a supporting base, a stage for supporting an opaque object for examination above said base, means for providing coarse adjustment of said stage relative to said base, a turret carrying a plurality of objectives positioned beneath said stage, a bracket rotatably supporting said turret so as to allow selective positioning of any one of said objectives in optical alignment with an object on said stage, a vertical illuminator mounted in relatively fixed relation to said base and located beneath said turret so as to direct light for illuminating said object upwardly toward the objective aligned with the object on said stage, a lens system in optical alignment with said aligned objective and illuminator and arranged to receive light from said objective for forming an enlarged image of said object, and a fine adjustment mechanism supported by said base and operatively associated with said bracket for moving said aligned objective relative to said base.

3. An instrument of the character described comprising a supporting base, a stage for supporting opaque objects for examination above said base, means for providing coarse adjustment of said stage relative to said base, a turret carrying a plurality of objectives positioned beneath said stage, a bracket rotatably supporting said turret so as to allow selective positioning of any one of said objectives in optical alignment with an object on said stage, a vertical illuminator mounted in relatively fixed relation to said base and located beneath said turret so as direct light for illuminating said object upwardly toward the objective aligned with the object on said stage, a lens system in optical alignment with said aligned objective and illuminator and arranged to receive light from said objective for forming an enlarged image of said object, a fine adjustment mechanism supported by said base and arranged to move said bracket and aligned objective relative to said base, a recess formed centrally in the lower surface of said stage, and adjustable means for moving said stage laterally relative to said base, said turret and objectives being so constructed and arranged as to allow free movement of any one of said objectives into an optically aligned position relative to said object with the upper end of said objectives into an optically aligned position relative to said object with the upper end thereof within said recess and without contacting said stage.

4. An instrument of the character described comprising a supporting base, a stage for supporting opaque objects for examination above said base, a turret carrying a plurality of objectives of different predetermined magnifications positioned beneath said stage, a bracket rotatably supporting said turret so as to allow selective positioning of any one of said objectives in optical alignment with an object on said stage, a vertical illuminator having a protective casing normally mounted in relatively fixed relation to said base and a semi-transparent reflector angularly and adjustably mounted within said casing and located beneath said turret so as to direct light for illuminating said object upwardly toward the objective aligned with the object on said stage, a lens system in optical alignment with said aligned objective and illuminator and arranged to receive light from said aligned objective for forming an enlarged image of said object, and an adjustment mechanism supported by said base and arranged to move said bracket and aligned objective into accurately focused relation relative to said object, said objectives being mounted on said turret in parfocalized relation so that a different magnification of the object under examination may be effected merely by rotating the desired objective into optical alignment with said object.

5. An instrument of the character described comprising a supporting base, a stage for supporting opaque objects for examination, a turret carrying a plurality of objectives of different predetermined magnifications positioned beneath said stage, a bracket rotatably supporting said turret so as to allow selective positioning of any one of said objectives in optical alignment with an object on said stage, a vertical illuminator mounted in relatively fixed relation to said base and located beneath said turret so as to direct light for illuminating said object upwardly toward the objective aligned with the object on said stage, optical elements including an eye lens system in optical alignment with said aligned objective and illuminator and arranged to receive light from said objective for forming an enlarged virtual image of said object, and an adjustment mechanism supported by said base and arranged to move said bracket and aligned objective into accurately focused relation relative to said object, said objectives being mounted on said turret in parfocalized relation so that a different magnification of the object under examination may be effected merely by rotating the desired objective into optical alignment with said object.

6. An instrument of the character described comprising a supporting base, a stage for supporting opaque objects for examination, a turret carrying a plurality of objectives of different predetermined magnifications positioned beneath said stage, a bracket rotatably supporting said turret so as to allow selective positioning of any one of said objectives in optical alignment with an object on said stage, a vertical illuminator mounted in relatively fixed relation to said base and located beneath said turret so as to direct light for illuminating said object upwardly toward the objective aligned with the object on said stage, a projection lens system in optical alignment with said aligned objectives and illuminator, a plate for receiving an enlarged image of the object projected by said lens system, and an adjustment mechanism supported by said base and arranged to move said bracket and said aligned objective into accurately focused relation relative to said object, said objectives being mounted on said turret in parfocalized relation so that a different magnification of the object under examination may be effected merely by rotating the desired objective into optical alignment with said object.

7. An instrument of the character described comprising a supporting base, a stage for supporting opaque objects for examination, a turret carrying a plurality of objectives of different predetermined magnifications positioned beneath said stage, a bracket rotatably supporting said turret so as to allow selective positioning of any one of said objectives in optical alignment with an object on said stage, a vertical illuminator mounted in relatively fixed relation to said base and located beneath said turret so as to direct light for illuminating said object upwardly toward the objective aligned with the object on said stage, a projection lens system in optical alignment with said aligned objective and illuminator, a plate for receiving an enlarged image of the object projected by said projection lens system, an eye lens system, a reflector supported by said base for movement into an operative position between said illuminator and projection lens system, said reflector being, when in said operative position, optically aligned with said aligned objective and angularly disposed so as to reflect light rays from said object toward said eye lens system, and an adjustment mechanism supported by said base and arranged to move said bracket and aligned objective into accurately focused relation relative to said object, said objectives being mounted on said turret in parfocalized relation so that a change in magnification of the object under examination may be effected upon said plate or in said eye lens system, depending upon the position of said movable reflector, merely by rotating the desired objective into optical alignment with said object.

8. An instrument of the character described comprising a base, a stage for supporting opaque objects for examination, a first lens system beneath said stage, means for supporting said first lens system so as to be optically aligned with an object on said stage and for accurately adjusting the relative spacing between said first lens system and said stage, a vertical illuminator mounted in relatively fixed relation to said base and located so as to direct light upwardly toward said object, said first lens system being arranged to collect light from said object and focus said light at a first focal plane at a predetermined distance from said first lens system, a projection lens system in optical alignment with said first lens system and arranged so as to focus at said first focal plane, a plate for receiving an enlarged image of predetermined magnification of the object projected by said projection lens system, a reflector supported by said base for movement into an operative position in optical alignment with said first lens system, said reflector being, when in said operative position, angularly disposed relative to said first lens so as to reflect the light rays from said object and focus same at a second focal plane, an eye lens system carried in relatively fixed relation to said base and in optical alignment with said first lens system, said eye lens system being arranged to focus at said second focal plane so as to form therein a virtual image of said object of substantially the same magnification as that projected by said projection lens system onto said plate.

9. An instrument of the character described comprising a base, a stage for supporting opaque objects for examination, a first lens system beneath and adjacent said stage, means associated with said lens system for accurately adjusting the spacing between said first lens system and said stage, a vertical illuminator mounted in relatively fixed relation to said base and located so as to direct light upwardly toward an object on said stage, said first lens system being arranged to collect light rays from said object and focus same at a first focal plane at a predetermined distance from said first lens system, a reflector supported by said base for movement from an inoperative to an operative position in optical alignment with said first lens system and angularly disposed relative thereto so as to cause said rays to be reflected and focus at a second focal plane a predetermined distance from said first lens system, a set of projection lens systems of different predetermined magnifications carried by said base and arranged to be selectively located in an operative position in optical alignment with said first lens system and focused at said first focal plane, a plate associated therewith for receiving enlarged images of said object when projected by any one of said projection lens systems, said plate being axially adjustable to any one of a plurality of predetermined settings corresponding to the image planes of said projection lens systems, and a set of eye lens systems having a graduated range of magnifications substantially proportional to the magnifications of said projection lens systems and adapted to be selectively positioned in an operative position in optical alignment with said first lens system and reflector and focused at said second focal plane, whereby when said first lens system is accurately focused upon the object on the stage an enlarged sharp image may be formed either in the aligned eye lens system or projected by the corresponding projection lens system onto said plate, as desired, by merely moving said reflector into its operative or inoperative positions and adjusting said plate to its proper setting.

10. An instrument of the character described comprising a hollow supporting base, a stage for supporting opaque objects for examination, a first lens system beneath and adjacent said stage, means associated with said lens system for accurately adjusting the spacing between said first lens system and said stage, a vertical illuminator mounted above and in relatively fixed relation to said base and located so as to direct light upwardly toward an object on said stage, said first lens system being arranged to collect light rays from said object and focus same within said base at a first focal plane a predetermined distance from said first lens system, a reflector supported by and above said base for movement from an inoperative to an operative position in optical alignment with said first lens system and angularly disposed relative thereto so as to cause said rays to be reflected and focus at a second focal plane above said hollow base and at a predetermined distance from said first lens system, a set of projection lens systems of different predetermined magnifications carried by and within said base and arranged to be selectively located in an operative position in optical alignment with said first lens system and focused at said first focal plane, a plate associated therewith for receiving enlarged images of said object when projected by any one of said projection lens systems, said plate forming a wall portion of said hollow base and being axially adjustable into any one of a plurality of predetermined settings corresponding to the image planes of said projection lens systems, and a set of eye lens systems having a graduated range of magnifications, substantially proportional to the magnifications of said projection lens systems and adapted to be selectively positioned in an operative position in optical alignment with said first lens system and reflector and focused at said second focal plane so as to form in the aligned eye lens system an image of substantially the same magnification as that projected by the corresponding projection lens system.

11. An instrument of the character described comprising a base, a stage for supporting opaque objects for examination above said base, an objective beneath said stage, an adjustment mechanism for supporting said objective in optical alignment with an object on said stage and for moving said objective axially relative to said stage, a vertical illuminator mounted in relatively fixed relation to said base and located beneath said objective, said illuminator being arranged to direct a substantially parallel beam of light for illuminating said object upwardly toward said objective, an image forming lens system carried by said base in optical alignment with said objective and illuminator, said image forming lens system being positioned so as to focus at a predetermined focal plane at a distance from said illuminator, a long focal length lens system between said illuminator and said image forming lens system and optically aligned therewith so as to receive from said objective and illuminator a substantially parallel beam of light and focus said beam substantially at said predetermined focal plane, and a mount for said long focal length lens system arranged to allow axial adjustment thereof for accurately focusing said light beam at said predetermined focal plane.

12. An instrument of the character described comprising a base, a stage for supporting opaque objects for examination above said base, an objective beneath said stage, an adjustment mechanism for supporting said objective in optical alignment with an object on said stage and for moving said objective axially relative to said stage, a vertical illuminator mounted in relatively fixed relation to said base and located beneath said objective, said illuminator being arranged to direct a substantially parallel beam of light for illuminating said object upwardly toward said objective, a plurality of lens systems of different magnifications carried by a member mounted for movement relative to said base, said member being arranged to selectively move any one of said systems into optical alignment with said objective and illuminator, each of said lens systems being positioned when in optical alignment so as to focus at a predetermined focal plane at a distance from said illuminator, a long focal length lens system optically aligned with said illuminator and objective and arranged to receive therefrom a substantially parallel beam of light and focus said beam substantially at said predetermined focal plane, and a mount for said long focal length lens system arranged to allow slight axial adjustment thereof for accurately focusing said beam at said predetermined focal plane.

13. An instrument of the character described comprising a housing, a stage for supporting opaque objects for examination, an objective beneath said stage, an adjustment mechanism for supporting said objective in optical alignment with an object on said stage and for moving said objective axially relative to said stage, a vertical illuminator having an enclosed casing mounted in relatively fixed relation to said housing and located beneath said objective, a transparent window in and closing an upper wall of said casing, a semi-transparent reflector within said illuminator casing and arranged to direct a substantially parallel beam of light for illuminating said object upwardly through said window and toward said objective, an image forming lens system carried by said housing in optical alignment with said objective and arranged to focus at a predetermined focal plane, an intermediate lens system in and closing a lower wall of said casing and optically aligned with said objective so as to receive therefrom a substantially parallel beam of light and focus said beam substantially at said predetermined focal plane, and an adjustable mount for said intermediate lens system positioned so as to completely close the opening in said lower wall and arranged to allow said intermediate lens systems to be moved axially into a position to be accurately focused at said predetermined focal plane.

14. An instrument of the character described comprising a housing, a stage for supporting opaque objects for examination, an objective beneath said stage, an adjustment mechanism for supporting said objective in optical alignment with an object on said stage and for moving said objective axially relative to said stage, a vertical illuminator mounted in relatively fixed relation to said housing and located beneath said objective, said illuminator being arranged to direct a substantially parallel beam of light for illuminating said object upwardly toward said objective, an eye lens system optically aligned with said illuminator and objective and positioned so as to focus at a predetermined focal plane at a distance from said illuminator, an intermediate lens system optically aligned with said illuminator and objective and arranged to receive a substantially parallel beam of light therefrom, said intermediate lens system being axially adjustable for slight movement into a position to accurately focus said beam at said predetermined focal plane, a reflector movable into a first position or a second position for directing the light from said illuminator toward said predetermined focal plane or toward a second predetermined focal plane, a projection lens system positioned so as to be optically aligned with said intermediate lens system when said reflector is in one of its positions and positioned so as to be accurately focused at said second focal plane, and a plate carried by said housing and arranged to receive an enlarged image of said object from said projection lens system.

15. An instrument of the character described comprising a housing, a stage for supporting opaque objects for examination, an objective beneath said stage, an adjustment mechanism for supporting said objective in optical alignment with an object on said stage and for moving said objective axially relative to said stage, a vertical illuminator mounted in relatively fixed relation to said housing and located beneath said objective, said illuminator being arranged to direct a substantially parallel beam of light for illuminating said object upwardly toward said objective, an eye lens system optically aligned with said illuminator and objective and positioned so as to focus at a predetermined focal plane at a distance from said illuminator, an intermediate lens system optically aligned with said illuminator and objective and arranged to receive a substantially parallel beam of light therefrom, said intermediate lens system being axially adjustable for slight movement into a position to accurately focus said beam at said predetermined focal plane, a reflector movable into a first position or a second position for directing the light from said illuminator toward said predetermined focal plane or toward a second predetermined focal plane, a plurality of projection lens systems of different magnifications carried by a member in said housing mounted for movement relative to said housing, said member being arranged to selectively move each one of said projection lens systems into an operative position so as to be in optical alignment with said intermediate lens system and accurately focused at said second focal plane when said reflector is in one of its positions, and an axially adjustable plate carried by said housing and arranged to receive an enlarged image of said object when projected by any one of said projection lens systems.

16. An instrument of the character described comprising a housing, a stage for supporting opaque objects for examination, an objective beneath said stage, an adjustment mechanism for supporting said objective in optical alignment with an object on said stage and for moving said objective axially relative to said stage, a vertical illuminator mounted in relatively fixed relation to said housing and located beneath said objective, said illuminator being arranged to direct a substantially parallel beam of light for illuminating said object upwardly toward said objective, an eye lens system optically aligned with said illuminator and objective and positioned so as to focus at a predetermined focal plane at a distance from said illuminator, an intermediate lens system optically aligned with said illuminator and objective and arranged to receive a substantially parallel beam of light therefrom, said intermediate lens system being axially adjustable for slight movement into a position to accurately focus said beam at said predetermined focal plane, a reflector movable into a first position or a second position for directing the light from said illuminator toward said predetermined focal plane or toward a second predetermined focal plane, a plurality of projection lens systems of different magnifications carried by a member in said housing mounted for movement relative to said housing, said member being arranged to selectively move each one of said projection lens systems into an operative position so as to be in optical alignment with said intermediate lens system and accurately focused at said second focal plane when said reflector is in one of its positions, a plate adjustably carried by said housing for axial movement relative to the projection lens system in said operative position, and means associated with said plate and said housing for indicating proper positions of adjustment of said plate for each projection lens system.

17. An instrument of the character described comprising a housing, a stage for supporting opaque objects for examination, an objective beneath said stage, means for supporting said objective in optical alignment with an object on said stage and for changing the relative spacing between said objective and said stage, a vertical illuminator mounted in relatively fixed relation to said housing and located beneath said objective, said illuminator being arranged to direct light upwardly toward said objective, an intermediate lens system optically aligned with said illuminator and objective and arranged to receive a beam of light therefrom, and focus same at a predetermined focal plane at a distance from said lens system, a plurality of projection lens systems of different magnifications carried by a member in said housing mounted for movement relative to said housing, said member being arranged to selectively move each of said projection lens systems into an operative position in optical alignment with said intermediate lens system and so as to be accurately focused at said focal plane, and a plate adjustably carried by said housing and movable into any one of a plurality of predetermined positions for receiving enlarged images of said object when projected by any one of said projection lens systems.

18. An instrument of the character described comprising a housing, a stage for supporting opaque objects for examination, an objective beneath said stage, means for supporting said objective in optical alignment with an object on said stage and for changing the relative spacing between said objective and said stage, a vertical illuminator comprising a substantially completely enclosed dust-proof protective casing mounted in relatively fixed relation to said housing and located beneath said objective, a transparent window in an upper wall of said casing, a reflector within said casing and arranged to direct light upwardly through said window and toward said objective, an intermediate lens system in a lower wall of said casing and optically aligned with said objective so as to receive a beam of light therefrom and focus same at a predetermined focal plane at a distance therefrom, a plurality of projection lens systems of different magnifications carried by a member in said housing mounted for movement relative to said housing, said member being arranged to selectively move each of said projection lens systems into an operative position in optical alignment with said intermediate lens system and so as to be accurately focused at said focal plane, and a plate adjustably carried by said housing for axial movement relating to the operative position of said projection lens systems.

19. An instrument of the character described comprising a housing, a stage for supporting opaque objects for examination, a lens system beneath said stage, means for supporting said lens system in optical alignment with an object on said stage, an adjustment mechanism for changing the relative spacing between said stage and said lens system, a vertical illuminator mounted in relatively fixed relation to said housing and arranged to direct light upwardly toward the object on said stage, said lens system being arranged to direct light from said object downwardly as a beam focused at a predetermined focal plane at a distance therefrom, an upwardly and rearwardly sloping plate arranged adjacent an opening in a front wall of said housing, said plate being disposed forwardly of and in adjacent relation to said downwardly directed beam, reflecting means positioned in said housing so as to direct said beam rearwardly and then downwardly, a projection lens system optically aligned with said reflecting means and first lens system and arranged to direct said beam as image forming rays in a downwardly direction, and a reflector in optical alignment with said projection lens system and angularly disposed relative thereto so as to cause said rays to be reflected upwardly and forwardly onto said plate as an enlarged image of said object.

20. An instrument of the character described comprising a housing, a stage for supporting opaque objects for examination, a lens system beneath said stage, means for supporting said lens system in optical alignment with an object on said stage, an adjustment mechanism for changing the relative spacing between said stage and said lens system, a vertical illuminator mounted in relatively fixed relation to said housing and arranged to direct light upwardly toward the object on said stage, said lens system being arranged to direct a beam of light from said object downwardly so as to focus said beam at a predetermined focal plane at a distance therefrom, an upwardly and rearwardly sloping plate arranged to close an opening in a front wall of said housing, said plate being disposed forwardly of and in adjacent relation to said downwardly direction beam of light, reflecting means positioned in said housing so as to direct said light rearwardly and then downwardly, a projection lens system optically aligned with said reflecting means and first lens system and arranged to direct said light as image forming rays in a downwardly direction, a reflector in optical alignment with said projection lens system and angularly disposed relative thereto so as to cause said rays to be reflected upwardly and forwardly onto said plate as an enlarged image of said object, an eye lens system carried by said housing at a position intermediate said plate and said stage for viewing an enlarged image of said object, and a movable reflector carried by said housing and arranged to be moved into an operative position between said first lens system and said reflecting means for directing said light toward said eye lens system.

21. An instrument of the character described comprising a housing, a stage for supporting opaque objects for examination, a lens system beneath said stage, means for supporting said lens system in optical alignment with an object on said stage, an adjustment mechanism for changing the relative spacing between said stage and said lens system, a vertical illuminator mounted in relatively fixed relation to said housing and arranged to direct light upwardly toward the object on said stage, said lens system being arranged to direct light from said object downwardly as a beam focused at a predetermined focal plane at a distance therefrom, an upwardly and rearwardly sloping plate arranged adjacent an opening in a front wall of said housing, said plate being disposed forwardly of and in adjacent relation to said downwardly directed beam, reflecting means positioned in said housing so as to direct said beam rearwardly and then downwardly, a plurality of projection lens systems of different magnifications carried by a member in said housing and mounted for movement relative to said housing, said member being arranged to selectively move each of said projection lens systems into an operative position in optical alignment with said reflecting means and said first lens system, and arranged to direct the light therefrom downwardly as image forming rays, a reflector in optical alignment with said image forming rays and angularly disposed relative thereto so as to cause same to be reflected upwardly and forwardly toward said plate, and an adjustable connection between said housing and said plate for allowing said plate to be moved outwardly relative to said housing into predetermined positions of adjustment for effecting proper focussing of said image forming rays upon said plate according to the projection lens system being employed in the instrument.

22. An instrument of the character described comprising a housing, a stage for supporting opaque objects for examination, a lens system beneath said stage, means for supporting said lens system in optical alignment with an object on said stage, an adjustment mechanism for changing the relative spacing between said stage and said lens system, a vertical illuminator mounted in relatively fixed relation to said housing and arranged to direct light upwardly toward the object on said stage, said lens system being arranged to direct light from said object downwardly as a beam focussed at a predetermined focal plane at a distance therefrom, an upwardly and rearwardly sloping plate arranged adjacent an opening in a front wall of said housing, said plate being disposed forwardly of and in adjacent relation to said downwardly directed beam, reflecting means positioned in said housing so as to direct said beam rearwardly and then downwardly, a plurality of projection lens systems of different magnifications carried by a member in said housing and mounted for movement relative to said housing, said member being arranged to selectively move each of said projection lens systems into an operative position in optical alignment with said reflecting means and said first lens system, and arranged to direct the light therefrom downwardly as image forming rays, a reflector in optical alignment with said image forming rays and angularly disposed relative thereto so as to cause same to be reflected upwardly and forwardly toward said plate, an adjustable connection between said housing and said plate for allowing movement of said plate in said upwardly and forwardly direction for effecting proper focussing of said rays on said plate according to the projection lens system being employed, an eye lens system carried by said housing at a position intermediate said plate and said stage for viewing an enlarged image of said object, and a movable reflector carried by said housing and arranged for movement into an operative position between said first lens system and reflecting means for directing the light toward said eye lens system, said eye lens system extending in the same generally upwardly and forwardly direction as that provided for adjustment of said plate.

23. An instrument of the character described comprising a supporting base, a stage for supporting opaque objects for examination, an objective beneath said stage, means for supporting said objective in optical alignment with an object on said stage and for changing the relative spacing between said objective and said stage, a vertical illuminator casing carried by said base and located beneath said objective, a reflector within said casing for directing light upwardly toward said objective, an image forming lens system carried by said base in optical alignment with said objective and arranged to focus at a predetermined focal plane, an intermediate lens system carried by said casing beneath said reflector, means carried by said casing for adjustably mounting said reflector so as to be movable into predetermined angular relation relative to the optical axis of said intermediate lens system, means for adjustably mounting said casing on said supporting base so as to be movable into a position accurately optically aligning said intermediate lens system and reflector with said objective, and means for mounting said intermediate lens system for axial adjustment relative to said casing so as to be adjustable into a position to focus light from said objective at said predetermined focal plane.

DAVID D. LOWBER.
JOSEPH D. REARDON.

REFERENCES CITED

The following references are of record in the file of this patent:

UNITED STATES PATENTS

| Number | Name | Date |
|---|---|---|
| 2,209,532 | Michel | July 30, 1940 |
| 2,211,218 | Serrurier | Aug. 13, 1940 |
| 2,313,639 | Hauser | Mar. 9, 1943 |
| 2,373,929 | Turrettini | Apr. 17, 1945 |
| 2,378,870 | Soetbeer | June 19, 1945 |
| 2,414,977 | Reid et al. | Jan. 28, 1947 |

FOREIGN PATENTS

| Number | Country | Date |
|---|---|---|
| 368,038 | Great Britain | Mar. 3, 1932 |